United States Patent [19]

Avar

[11] Patent Number: 4,920,169

[45] Date of Patent: Apr. 24, 1990

[54] OXALIC ACID DI(PHENYLAMIDES) AND USE THEREOF AS UV ABSORBERS

[75] Inventor: Lajos Avar, Biel-Benken, Switzerland

[73] Assignee: Sandoz Ltd., Basel, Switzerland

[21] Appl. No.: 357,572

[22] Filed: May 26, 1989

Related U.S. Application Data

[63] Continuation of Ser. No. 126,647, Dec. 1, 1987, abandoned.

[30] Foreign Application Priority Data

Dec. 2, 1986 [GB] United Kingdom ............... 862870
Jan. 21, 1987 [GB] United Kingdom ............. 8701273

[51] Int. Cl.$^5$ ............................................. C08K 5/20
[52] U.S. Cl. ................................. 524/219; 560/19; 560/45; 562/455; 564/158
[58] Field of Search ............. 524/219; 560/19, 46, 560/45; 562/455; 564/158

[56] References Cited

U.S. PATENT DOCUMENTS

| | | | |
|---|---|---|---|
| 3,529,982 | 9/1970 | Luethi et al. | 564/158 |
| 3,808,273 | 4/1974 | Burdet et al. | 564/158 |
| 3,906,033 | 9/1975 | Biland et al. | 562/455 |

*Primary Examiner*—Veronica P. Hoke

*Attorney, Agent, or Firm*—Gerald D. Sharkin; Richard E. Vila; Thomas C. Doyle

[57] ABSTRACT

A compound of formula I

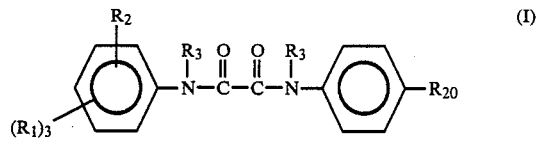

in which
each $R_1$, independently is selected from hydrogen, $C_{1-12}$alkyl, $C_{1-12}$alkoxy and halogen;
$R_2$ has a significance of $R_1$, independently of $R_1$, or is —OH;
$R_{20}$ is —CO—OR$_6$ or, when each $R_1$ is hydrogen and $R_2$ is 2-$C_{1-4}$alkoxy, $R_{20}$ is additionally —OH;
$R_3$ is hydrogen or methyl (more preferably hydrogen); and
$R_6$ is hydrogen; unsubstituted $C_{6-22}$alkyl, uninterrupted or interrupted by 1 or 2 oxygen atoms or $C_{1-22}$alkyl mono- or di-substituted by OH and uninterrupted or interrupted by 1 or 2 oxygen atoms;
provided when each RF$_1$ and $R_2$ is hydrogen, then $R_6$ is not hydrogen.

20 Claims, No Drawings

OXALIC ACID DI(PHENYLAMIDES) AND USE THEREOF AS UV ABSORBERS

This is a continuation of application Ser. No. 126,647, filed Dec. 1, 1987, now abandoned.

The invention relates to novel oxalanilides suitable for use as U.V. absorbers.

According to the invention, there is provided a compound of formula I

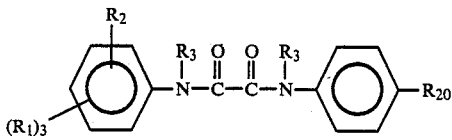

in which
each $R_1$, independently is selected from hydrogen, $C_{1-12}$alkyl, $C_{1-12}$alkoxy and halogen;
$R_2$ has a significance of $R_1$, independently of $R_1$, or is —OH;
$R_{20}$ is —CO—OR$_6$ or, when each $R_1$ is hydrogen and $R_2$ is 2-$C_{1-4}$alkoxy, $R_{20}$ is additionally —OH;
$R_3$ is hydrogen or methyl (more preferably hydrogen); and
$R_6$ is hydrogen; unsubstituted $C_{6-22}$alkyl, uninterrupted or interrupted by 1 or 2 oxygen atom or $C_{1-22}$alkyl mono- or di-substituted by OH and uninterrupted or interrupted by 1 or 2 oxygen atoms;
provided when each $R_1$ and $R_2$ is hydrogen, then $R_6$ is not hydrogen.

Preferably $R_{20}$ is —CO—OR$_6$.

In this Specification, any group capable of being linear or branched is linear or branched unless indicated to the contrary. In this Specification where a symbol appears more than once in a formula its significances are independent of one another.

Preferably $R_1$ is $R_1'$ where $R_1'$ is selected from hydrogen, $C_{1-4}$alkyl, $C_{1-4}$alkoxy and chlorine. More preferably each $R_1$ is hydrogen.

Preferably $R_2$ is $R_2'$ where $R_2'$ is hydrogen or $C_{1-2}$alkoxy, preferably in the ortho-position.

Preferably $R_6$ is $R_6'$ where $R_6'$ is unsubstituted $C_{6-18}$alkyl, uninterrupted or interrupted by one —O— group or $C_{1-18}$alkyl monosubstituted by OH and uninterrupted or interrupted by one or two (preferably one) —O— groups.

More preferably $R_6$ is $R_6''$ where $R_6''$ is unsubstituted $C_{6-18}$alkyl or $C_{1-6}$alkyl monosubstituted by OH and uninterrupted or interrupted by one or two —O— groups. Most preferably, $R_6$ is $R_6'''$ where $R_6'''$ is unsubstituted $C_{6-18}$alkyl or $C_{2-6}$hydroxyalkyl or a group —X—O—Y wherein X is $C_{2-4}$alkylene, Y is $C_{1-4}$alkyl, one of X and Y is substituted by hydroxy and the total number of carbon atoms in X and Y together is 4 to 6, provided that in the group OR$_6'''$ each pair of oxygen atoms is separated by at least two carbon atoms.

Any $C_{1-12}$alkyl group is preferably $C_{1-8}$alkyl, more preferably $C_{1-4}$alkyl, most preferably methyl or ethyl. Any $C_{1-12}$alkoxy is preferably $C_{1-8}$alkoxy, more preferably $C_{1-4}$alkoxy, most preferably ethoxy or methoxy. Preferably any $C_{1-4}$alkyl is methyl or ethyl and any $C_{1-4}$alkoxy is ethoxy or methoxy.

Further, according to the invention, there is provided a process for preparing a compound of formula I where $R_{20}$ is —COOR$_6$ comprising reacting a compound of formula II

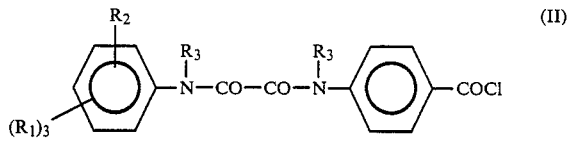

with a compound of formula III $$HO—R_6 \quad (III)$$

where the symbols are as defined above, at an elevated temperature.

Compounds of formula II and III can be prepared by known methods from known compounds.

Preferably a process according to the invention is carried out at a temperature of from 50° to 120° C.

Preferably a process according to the invention is carried out at a pH of from 7 to 9.

For the avoidance of doubt where a range is defined, the numbers defining the range are included in the range.

Further, according to the invention, there is provided a a process for preparing a compound of formula I in which $R_{20}$ is —OH comprising reacting a compound of formula VI

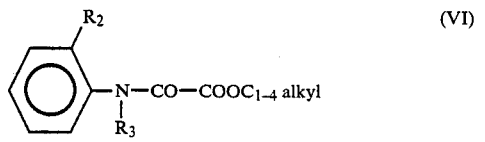

with a compound of formula VII

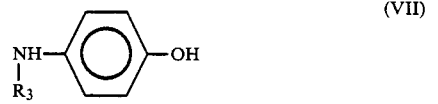

at an elevated temperature.

Further according to the invention, there is provided a compound of formula V

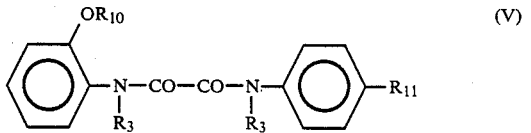

where $R_3$ is as defined above, $R_{10}$ is hydrogen, methyl or ethyl and $R_{11}$ is —OH or —COOH.

Preferably $R_{10}$ is $R_{10}'$ where $R_{10}'$ is methyl or ethyl.
Preferably $R_{11}$ is —COOH.

Still, further according to the invention, there is provided a process for stabilizing a polymeric substrate comprising adding to the substrate a light stabilising amount of a compound of formula I or V defined above.

Compounds of formula I are useful as stabilizers to protect polymeric materials against degradation by light. The compounds have particularly good solubility and miscibility in solvent systems and in liquid polymers and prepolymers, which makes them useable in a wide range of polymeric materials.

Suitable polymeric materials include plastics materials for examples polyethylene, polypropylene, ethylene/propylene copolymers, polyvinyl chloride, polyester, polyamide, polyurethane, polyacrylontrile, ABS, terpolymers of acrylates, styrene and acrylonitrile, styrene/acrylonitrile and styrene/butadiene. Other plastics materials such as polybutylene, polystyrene, chlorinated polyethylene, polycarbonate, polymethylmethacrylate, polyphenylene oxide, polypropylene oxide, polyacetals, phenol/formaldehyde resins and epoxy resins may also be used. Preferred plastics materials are polypropylene, polyethylene, ethylene/propylene copolymers and ABS. Natural polymers for example natural rubber may also be stabilized, as may lubricating oils containing polymeric material.

The compounds of formula I may be incorporated by known methods into the polymeric material to be stabilized. Of particular importance is blending of the compounds with thermoplastic polymers in the melt, for example in a melt blender or during the formation of shaped articles, including foils, films, tubes, containers, bottles, fibres and foams by extrusion, injection moulding, blow moulding, spinning or wire coating.

It is not essential for the polymeric material to be fully polymerised before mixing with the compounds according to the invention. The compounds may be mixed with monomer, prepolymer or precondensate, and the polymerisation or condensation reaction carried out subsequently. This will of course be the preferred method of incorporation of the compounds into thermosetting polymers, which cannot be melt blended.

The compounds of formula I may be used alone or in combination with other stabilizers, for example hindered amine light stabilizers such as tetraalkylpiperidine light stabilizers and antioxidants.

Compounds of formula I with hindered amine light stabilizers may produce a synergistic effect in polymeric systems. Preferred hindered amine light stabilizers are those described in U.S. Pat. No. 4,408,051 and GB Patent 2,091,732 B, the contents of both patents (including their preferences) are incorporated herein by reference. Examples of other stabilizers include sterically hindered phenols, sulphur or phosphorus-containing compounds or mixtures of these. More specific examples of these other stabilizers are benzofuran-2-ones; indolin-2-ones and sterically hindered phenols such as indolin-2-ones and sterically hindered phenols such as beta-(4-hydroxy-3,5-ditert.-butylphenyl)-propionyl stearate, methane tetrakis(methylene-3(3',5'-ditert.-butyl-4-hydroxy-phenyl-)-propionate], 1,3,3-tris-(2-methyl-4-hydroxy-5-tert.-butyl phenyl)-butane, 1,3,5-tris(4-tert.-butyl-3-hydroxy-2,6-di-methylbenzyl)-1,3,5-triazin-2,4,6 (1H, 3H, 5H)-trione, bis-(4-tert.-butyl-3-hydroxy-2,6-dimethylbenzyl)dithiolterephthalate, tris(3,5-ditert.-butyl-4-hydroxybenzyl) isocyanurate, the triester of beta(4-hydroxy-3,5-ditert.butyl-phenyl) propionic acid with 1,3,4-tris-(2-hydroxyethyl)-5-triazin-2,4,6 (1H, 3H, 5H)-trione, bis [3,3,-bis-(4'-hydroxy-3-tert.butyl-phenyl)-butyricacid] glycol ester, 1,3,5-trimethyl-2,4,6-tris-(3,5-ditert.-butyl-4-hydroxy-benzyl) benzene, 2,2'-methylene-bis-(4-methyl-6-tert.-butyl-phenyl) terephthalate, 4,4-methylene-bis-(2,6-ditert.-butylphenol), 4,4'-butylidine-bis-(tert.-butylmetacresol), 2,2'-methylene-bis-(4-methyl-6-tert.-butyl-phenol).

Sulphur containing antioxidative co-stabilizers which may be used include for example distearylthiodipropionate, di-laurylthiodipropionate, methane tetrakis (methylene-3-hexylthiopropionate), methane tetrakis (methylene-3-dodecylthiopropionate)and dioctadecyldisulphide. Phosphorus-containing co-stabilizers include for example trinonylphenyl phosphite, 4,9-distearyl-3,5,8,10-tetraoxadiphosphaspiroundecane, tris-(2,4-ditert.butylphenyl)phosphite and tetrakis (2,3-ditert.-butylphenyl)-4,4'-biphenylene diphosphonite. Further additives such as aminoaryl compounds and U.V.-absorbers and light stabilizers e.g. 2-(2'-hydroxyphenyl)-benzotriazole, 2-hydroxybenzophenone, 1,3-bis-(2'-hydroxybenzoyl)benzene, salicylates, cinnamates, benzoates and substituted benzoates, sterically hindered amines and oxalic acid diamides may be used. Other known types of additives, e.g. flame retardants and antistatic agents, may also be added.

The compounds of the invention can also be used in photopolymeric substrates containing photoinitiators for the photopolymerisation.

The compounds of formula I are especially suitable for use in organic polymer-containing coatings, particularly automotive finishes.

Automotive finishes are generally solutions or dispersions of Ebetween polymer precursors in a thermosetting system, or to bring about fusion of particles of a thermoplastic polymer.

Many automotive finishes are metallic finishes, which contain flakes of metal, usually aluminium, in order to provide optical effects due to reflection. Such finishes are often two-coat finishes, in which a clear top coat finish is applied over a base coat finish containing a single pigment and/or metal flakes. The compounds of formula I can be in the top coat finish or the ground coat finish, preferably the former. Such two-coat metallic finishes have particular need of U.V.-stabilizers in the top coat, since the polymer in this coat is not protected by light-absorbing pigments, and it is subjected to almost double the normal amount of radiation because of reflection of light from the lower metallic layer.

The compounds of formula I are particularly useful in acid catalysed stoving finishes particularly in the top coats of two layer metallic finishes.

The compounds of formula I may be added to the finish at any stage in its manufacture, and may be added in solid form or in solution, preferably in the form of a liquid concentrate in a suitable solvent.

In practice the compounds of formula I are added as a solution in organic solvent to a liquid finish. In such finishes the binder material is between 35% (low solid finishes) and 70% by weight (high finishes); the binder material of the finish being in aqueous emulsion or suspension form (as an aqueous finish) and making up 20 to 30% by weight of the finish. The compounds of formula I can also be added to powder finishes.

The compounds of formula I are to be added to the liquid or powder finishes before stoving or hardening. Preferably the compounds of formula I are used in liquid finishes since it is easy to add exact dosages. It is particularly preferred to use a concentrate (preferably in a hydrocarbon solvent) containing at least 40% preferably 60 to 80% by weight of the total weight of the concentrate of a compound of formula I to introduce the compound of formula I to finishes for stoving.

The addition of from 0.01 to 8% by weight, preferably 0.2 to 4% by weight of one or more compounds of formula I, based on the dry weight of polymer therein gives a clear improvement in the light- and weather-stability of organic pigments in stoving finishes as well as reducing the tendency to hairline cracking and loss of gloss as the result of weathering. This is also found for metallic finishes and excellent long-term stability of the clear top coat of two layer metallic finishes is obtained. In such finishes, the compound of formula I may be added to the metallic undercoat, the clear top coat or both, preferably only to the clear top coat. The metal surface to be finished may be under-coated with primer coatings as is customary in the art of coating metal surfaces.

The invention will now be illustrated by the following Examples.

EXAMPLE 1

10.4 g of the compound of formula 1b

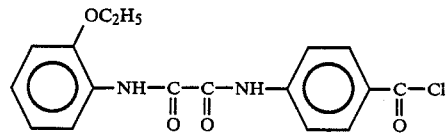
(1b)

are warmed with 4.3 g of 2-ethyl-1-hexanol (isooctanol) and 2.4 g of pyridine in 50 mls of toluene for 7 hours at 90° C. The white suspension is added to water, the toluene phase is separated off and then washed with water twice. The mixture is then concentrated and white residue is recrystallised from alcohol. The resulting product is of formula 1a

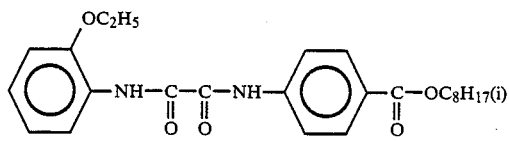
(1a)

and is a white powder having a melting point of 73°–75° C.

EXAMPLE 2

A mixture of 30 mls of ethylene glycol and 5.0 g of triethylamine is prepared and this is reacted with a suspension of 10.4 g of the compound of formula 1b (defined in Example 1) in 20 ml of tetrahydrofurane. A white product precipitates out. After one hour the mixture is diluted at 60° C. with methanol and then the product is filtered off, after which the product is washed with water.

After recrystallising from ethanol, the resulting product is of formula 2a

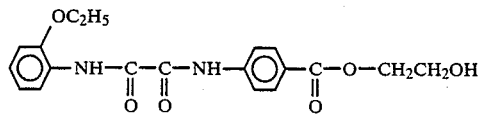
(2a)

and is a white powder having a melting point of 189°–190° C.

EXAMPLES 3 TO 5

The following compounds can be prepared by a method analogous to that of Example 1 or 2 from appropriate reactants.

EXAMPLE 3

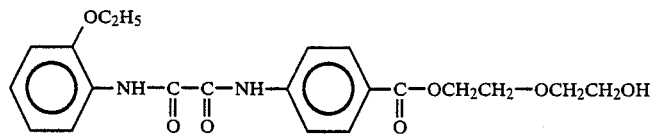

EXAMPLE 4

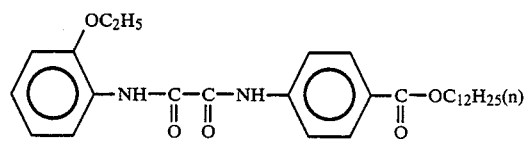

EXAMPLE 5

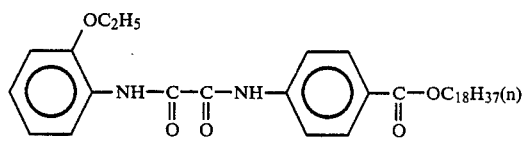

EXAMPLE 6

Preparation of the compound of formula 6a

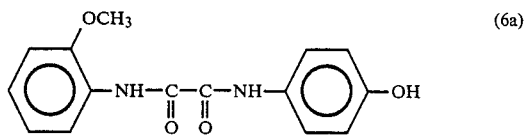
(6a)

22.3 g of the compound of formula 6b

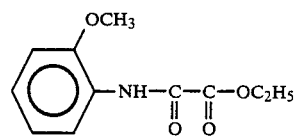
(6b)

10.9 g of p-aminophenol and
0.5 g of boric acid are placed in 30 ml of ethylene glycol at 110° C. The resulting alcohol is distilled off on a rotary evaporator. After cooling to about 80° C., 50 ml of methanol are added and then the mixture is cooled to room temperature. The resulting precipitate is then separated from the liquid phase by vacuuming off the latter.

The precipitate is then washed with water.

A grey-white product of formula 6a results having a melting point of 194°–196° C.

EXAMPLE 7

Preparation of the compound of formula 7a

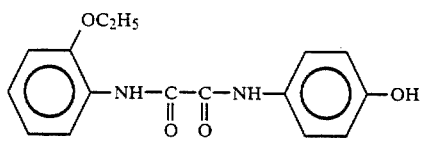

23.7 g of the compound of formula 7b

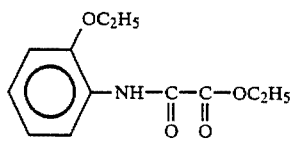

10.9 g of p-aminophenol and
0.5 g of boric acid
are added to 30 ml of ethylene glycol at 110° C.

The resulting alcohol is distilled off on a rotary evaporator. After cooling to 80° C., 50 ml of ethanol are added and then the mixture is cooled to room temperature.

The resultant precipitate is separated from the liquid phase by vacuuming off the latter. The precipitate is washed with water.

A white product of formula 7a results having a melting point of 190°–194° C.

EXAMPLE 8

A compound of formula 8a

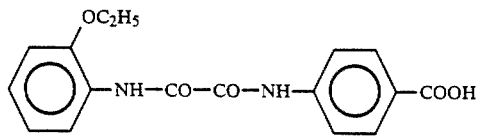

can be prepared from the appropriate acid chloride by the addition of water.

APPLICATION EXAMPLE A

A clear finish of
80 Parts of Viacryl SC 344 (a 50% solution of an acryl resin from Vianova),
13.9 Parts of Maprenal MF 80 (a 72% solution of a melamine resin from Hoechst) and
4.1 Parts of Byketol OK (from Byk-Malinckrodt)
is added to 2 parts of a compound of formula 1a (described in Example 1). After 1 minute the light stabiliser material so formed is dissovled in a finish. The finish is applied conventionally (according to the known 2 layer procedure) to a metallic or single pigment finish whilst still wet by spraying to form a layer having a thickness of 30 to 40 μm. The resulting coating is then hardened at 140° for 30 minutes. The coating shows very good resistance to U.V. light and weathering.

APPLICATION EXAMPLE B

A clear finish of
29.5 Parts of Setalux C-1502 XX-60 (a 60% solution of an acryl resin from Synthese B.V.),
39.2 Parts of Setalux C-1382 BX-45 (a 45% solution of an acryl resin from Synthese B.V.),
21.4 Parts of Setamine US-138 BB-70 (a 70% solution of a melamine resin from Synthese B.V.),
2.5 Parts of Baysilonoil [(2% solution in Xylene) from Bayer] and
7.4 Parts of Depanol Y (a solvent from Hoechst)
is stirred together with 2.5 parts of a compound of formula 1a (described in Example 1) and 2 parts of an acid catalyst derived from phosphoric acid (Type: Catalyst 269-9 from American Cyanamid) to form a homogeneous mixture. The finish is applied conventionally (according to known 2 layer procedure) to a metallic or single pigment finish whilst both are still wet by spraying to form a layer having a thickness of 30 to 40 μm. The resulting coating is then hardened at 110° for 20 minutes. The coating shows very good resistance to U.V. light and weathering.

APPLICATION EXAMPLE C

A clear finish of
75 Parts Macrynal SH 510 N (a hydroxy containing acryl resin from Bayer)
2 Parts of Baysilon-oil A [(1% solution in xylene) form Bayer]
0.3 Parts of dibutyl zinc dilaurate
0.35 Parts diethanolamine
5.0 Parts of ethylglycol acetate
5.0 Parts of Solvesso 100
6.0 Parts of Xylene and
6.36 Parts of butyl acetate.
is added to 2.5 parts of a compound of formula 1a (described in Example 1) and 30 parts of Desmodur N 75 (from Bayer). The homogeneous mixture so formed is applied conventionally (according to the known 2 layer procedure) to a metallic or single pigment finish whilst both are still wet by spraying to form a layer having a thickness of 30 to 40 μm and the resulting coating is hardened over 20 minutes at 80° to 90°. The resulting 2K-PUR coating shows a good resistance to U.V. light and weathering.

APPLICATION EXAMPLE D

A single white pigmented finish of
14.30 Parts of Setamine US-132 BB70 (a 70% solution of a melamine resin from Synthese)
57.15 Parts of Setal 84 W-70(70% solution of an alkyd resin from Synthese)
7.70 Parts of n-butanol
1.85 Parts of butylglycol acetate
9.50 parts of Xylene and
25 Parts of titanium dioxide (Rutil type)
is added with 1.38 parts of the product of formula 1a (see Example 1). The finish is conventionally applied to a grounded steel metal to which a filler of layer thickness 20 to 30 μm has been annealed, by spraying and after standing for 30 minutes at room temperature the steel metal surface is annealed at 120° C. for 30 minutes. The resulting coating shows very good resistance to U.V. light and weathering.

In Application Examples A to D instead of the product of formula 1a, an appropriate amount of the product of any one of Examples 2 to 8 may be used.

What is claimed is:
1. A compound of formula I

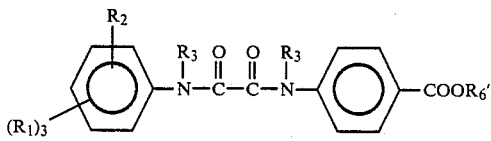
(I)

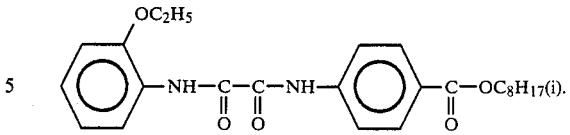

in which
each $R_1$, independently, is selected from hydrogen, $C_{1-12}$alkyl, $C_{1-12}$alkoxy and halogen;
$R_2$ is $C_{1-4}$alkoxy;
$R_3$ is hydrogen or methyl; and
$R_6'$ is unsubstituted $C_{6-18}$alkyl, uninterrupted or interrupted by one —O— group or $C_{1-18}$alkyl monosubstituted by OH and uninterrupted or interrupted by 1 or 2 —O— groups.

2. A compound according to claim 1, in which $R_1$ is $R_1'$ where $R_1'$ is hydrogen, $C_{1-4}$alkyl, $C_{1-4}$alkoxy or chlorine.

3. A compound according to claim 1, in which $R_2$ is $R_2'$ where $R_2'$ is $C_{1-2}$alkoxy.

4. A compound according to claim 2 wherein $R_2$ is $R_2'$ where $R_2'$ is $C_{1-2}$alkoxy.

5. A compound according to claim 2 wherein $R_2$ is $R_2'$ where $R_2'$ is $C_{1-2}$alkoxy and $R_6'$ is $R_6''$ where $R_6''$ is unsubstituted $C_{6-18}$alkyl or $C_{1-6}$alkyl monosubstituted by —OH and uninterrupted or interrupted by one or two —O— groups.

6. A compound according to claim 2 wherein $R_2$ is $R_2'$ where $R_2'$ is $C_{1-2}$ alkoxy and $R_6'$ is $R_6'''$ where $R_6'''$ is unsubstituted $C_{6-18}$alkyl or $C_{2-6}$ hydroxyalkyl or a group —X—O—Y wherein X is $C_{2-4}$alkylene, Y is $C_{1-4}$alkyl, one of X and Y is substituted by hydroxy and the total number of carbon atoms in X and Y together is 4 to 6, provided that in the group $OR_6'''$ each pair of oxygen atoms is separated by at least two carbon atoms.

7. A compound according to claim 3 wherein $R_2'$ is in the ortho position.

8. A compound according to claim 4 wherein $R_2'$ is in the ortho position.

9. A compound according to claim 5 wherein $R_2'$ is in the ortho position.

10. A compound according to claim 6 wherein $R_2'$ is in the ortho position.

11. A compound according to claim 10 of the formula

12. A polymeric material containing a light-stabilizing amount of a compound according to claim 4.

13. A polymeric material containing a light-stabilizing amount of a compound according to claim 6.

14. A polymeric material according to claim 12 wherein the polymeric material is selected from the group consisting of polyethylene, polypropylene, ethylene/propylene copolymers, polyvinyl chloride, polyester, polyamide, polyurethane, polyacrylonitrile, poly(acrylonitrile-butadiene-styrene), terpolymers of acrylates, styrene and acylonitrile, styrene/acrylonitrile, styrene/butadiene, polymethylmethacrylate, polyphenylene oxide, polypropylene oxide, polyacetals, phenol/formaldehyde resins, epoxy resins and natural rubber.

15. A polymeric material according to claim 13 wherein the polymeric material is selected from the group consisting of polypropylene, polyethylene, ethylene/propylene copolymers and poly(acrylonitrile-butadiene-styrene).

16. A compound according to claim 1, in which $R_6$ is $R_6'$ where $R_6''$ is unsubstituted $C_{6-18}$alkyl or $C_{1-6}$alkyl monosubstituted by —OH and uninterrupted or interrupted by one or two —O— groups.

17. A process for stabilising a polymeric substrate comprising adding a light stabilising amount of a compound of formula I according to claim 1, to the substrate.

18. A compound according to claim 1 wherein $R_6'$ is $R_6'''$ where $R_6'''$ is unsubstituted $C_{6-18}$alkyl or $C_{2-6}$hydroxyalkyl or a group —X—O—Y wherein X is $C_{2-4}$alkylene, Y is $C_{1-4}$alkyl, one of X and Y is substituted by hydroxy and the total number of carbon atoms in X and Y together is 4 to 6, provided that in the group $OR_6'''$ each pair of oxygen atoms is separated by at least two carbon atoms.

19. A polymeric material to which a light-stabilizing amount of a compound of formula I defined in claim 1, has been added.

20. A lacquer composition based on acrylic, alkyd or polyester resins containing a light-stabilizing amount of a compound of formula I defined in claim 1.

* * * * *